United States Patent
Song et al.

(10) Patent No.: US 10,118,523 B2
(45) Date of Patent: Nov. 6, 2018

(54) SEAT-BACK FRAME, METHOD FOR PREPARING THE SAME, AND SEAT-BACK FOR VEHICLE

(71) Applicant: LG HAUSYS, LTD., Seoul (KR)

(72) Inventors: Kang-Hyun Song, Anyang-si (KR);
Yong-Kil Kil, Gimpo-si (KR);
Tae-Hwa Lee, Gwangmyeong-si (KR);
Kyung-Hoon Lee, Seoul (KR);
Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/328,848

(22) PCT Filed: Sep. 24, 2015

(86) PCT No.: PCT/KR2015/010124
§ 371 (c)(1),
(2) Date: Jan. 24, 2017

(87) PCT Pub. No.: WO2016/048071
PCT Pub. Date: Mar. 31, 2016

(65) Prior Publication Data
US 2017/0210264 A1 Jul. 27, 2017

(30) Foreign Application Priority Data

Sep. 24, 2014 (KR) .......................... 10-2014-0127934

(51) Int. Cl.
*B60N 2/68* (2006.01)
*B29C 45/14* (2006.01)
(Continued)

(52) U.S. Cl.
CPC .......... *B60N 2/68* (2013.01); *B29C 45/14221* (2013.01); *B29C 45/14786* (2013.01);
(Continued)

(58) Field of Classification Search
CPC . B29C 70/16; B29C 70/462; B29C 45/14819; B60N 2/68; B60N 2/46; B29D 99/0092
(Continued)

(56) References Cited

U.S. PATENT DOCUMENTS 5,268,221 A * 12/1993 Nakanishi ............... B29C 70/16
152/556
2002/0170651 A1* 11/2002 Edwards ................ B29C 70/16
156/94
(Continued)

FOREIGN PATENT DOCUMENTS

CN      101774281 A    7/2010
CN      102917864 A    2/2013
(Continued)

OTHER PUBLICATIONS

International Search Report filed on Dec. 16, 2015 corresponding to International Application PCT/KR2015/010124.
(Continued)

*Primary Examiner* — Jose V Chen
(74) *Attorney, Agent, or Firm* — Hauptman Ham, LLP

(57) ABSTRACT

A seatback frame includes: a body frame comprising a long fiber reinforced thermoplastic (LFT) composite material; and an inner frame comprising a continuous fiber reinforced thermoplastic (CFT) composite material buried in the body frame by insert injection-molding. A method for manufacturing the same, and a seatback for vehicles including the same are also disclosed.

8 Claims, 4 Drawing Sheets

(51) Int. Cl.
  *B60N 2/75* (2018.01)
  *B29C 70/16* (2006.01)
  *B29C 70/46* (2006.01)
  *B29D 99/00* (2010.01)
  B29L 31/00 (2006.01)

(52) U.S. Cl.
  CPC ........ *B29C 45/14819* (2013.01); *B29C 70/16* (2013.01); *B29C 70/462* (2013.01); *B29D 99/0092* (2013.01); *B60N 2/686* (2013.01); *B60N 2/75* (2018.02); *B29L 2031/771* (2013.01)

(58) Field of Classification Search
  USPC .................................................... 297/411.41
  See application file for complete search history.

(56) References Cited

U.S. PATENT DOCUMENTS

| | | | | |
|---|---|---|---|---|
| 2006/0165955 | A1* | 7/2006 | Ruegg | B29C 70/081 428/113 |
| 2006/0275594 | A1* | 12/2006 | Wick | B29C 47/0011 428/292.1 |
| 2008/0268208 | A1* | 10/2008 | Martin | B29C 70/16 428/174 |
| 2008/0290555 | A1* | 11/2008 | Kim | B29C 45/0005 264/257 |
| 2009/0084925 | A1* | 4/2009 | Kismarton | A47C 5/00 248/503.1 |
| 2011/0169317 | A1* | 7/2011 | Fujita | A47C 7/02 297/452.2 |
| 2013/0169011 | A1* | 7/2013 | Evans | B60N 2/4228 297/216.13 |
| 2013/0320742 | A1* | 12/2013 | Murolo | B60N 2/68 297/452.18 |
| 2014/0139004 | A1* | 5/2014 | Matsumoto | B60N 2/68 297/452.18 |
| 2014/0252837 | A1* | 9/2014 | Yamaguchi | B60N 2/682 297/452.18 |
| 2014/0284987 | A1* | 9/2014 | Yasuda | B60N 2/68 297/452.18 |
| 2015/0061187 | A1* | 3/2015 | Estragnat | B29C 37/0075 264/323 |
| 2015/0274051 | A1* | 10/2015 | Mueller | B60N 2/68 296/68.1 |
| 2016/0318432 | A1* | 11/2016 | Zimmerbeutel | B32B 15/08 |
| 2016/0346975 | A1* | 12/2016 | Kamiji | B29C 45/14819 |
| 2017/0267145 | A1* | 9/2017 | Gonzalez Uribe | B60N 2/643 |

FOREIGN PATENT DOCUMENTS

| | | |
|---|---|---|
| JP | 2013508207 A | 3/2013 |
| JP | 2013539438 A | 10/2013 |
| JP | 2014091470 A | 5/2014 |
| KR | 10-2004-0029566 A | 4/2004 |
| KR | 10-2008-0023791 A | 3/2008 |
| KR | 10-1049454 B1 | 7/2011 |
| KR | 10-2012-0051146 A | 5/2012 |
| KR | 10-1198621 B1 | 11/2012 |
| KR | 10-2012-0062214 A | 6/2016 |
| WO | 2011/047748 A1 | 4/2011 |
| WO | 2012/032189 A1 | 3/2012 |
| WO | 2013089228 A1 | 4/2015 |

OTHER PUBLICATIONS

Extended Japanese Search Report dated Dec. 15, 2017 corresponding to Japanese Application No. 2017-510317.
Extended European Search Report dated Aug. 18, 2017 corresponding to European Application No. 15844675.7.
Chinese Office Action dated Jun. 12, 2018 for corresponding Chinese Application No. 201580039891.4.

* cited by examiner

| TEST RESULTS | | COMPARATIVE EXAMPLE 1 | EXAMPLE 1 |
|---|---|---|---|
| CFT LOCATION | | - | IMPACT OPPOSED SURFACE |
| SPECIMEN SHAPE | IMPACT SURFACE | LFT | LFT |
| | IMPACT OPPOSED SURFACE | | CFT |

SEAT-BACK FRAME, METHOD FOR PREPARING THE SAME, AND SEAT-BACK FOR VEHICLE

CROSS REFERENCE TO RELATED APPLICATION

This application claims the priority of Korean Patent Application No. 10-2014-0127934, filed on Sep. 24, 2014, in the KIPO (Korean Intellectual Property Office). Further, this application is the National Phase Application of International Application No. PCT/KR2015/010124, filed Sep. 24, 2015, which designates the United States and was published in Korean. Both of the priority documents are hereby incorporated by reference in their entireties.

TECHNICAL FIELD

The present disclosure relates to a seatback frame, a method for manufacturing the seatback frame, and a seatback for vehicles.

BACKGROUND ART

A seatback frame is the basic frame of a seatback that helps a passenger and a driver in comfortable and stable posture to thereby to allow them feel comfort and stable. Such a seatback frame is closely related to the safety of passengers, and thus there are a number of related regulations requiring no deformation or breakage against a certain level of force or impact. In order to meet these regulations and to ensure the safety of passengers, seat back frames have been made of steel. However, there is a problem of increasing cost and weight. Particularly, driving performance and fuel efficiency of vehicles are seriously lowered as the weight increases. In addition, when a seatback frame includes an armrest to provide more convenience for passengers and drivers, an additional manufacturing process for welding the seatback frame and the armrest frame after separately manufacturing them is required. As a result, it takes more time and cost, lowering productivity and economic efficiency. Therefore, a seat back frame has been manufactured using a single material such as a steel material, a glass mat thermoplastic (GMT) material or a long fiber reinforced thermoplastic resin. However, it is required to have a thick thickness because it does not have sufficient rigidity and strength against external impact, and thus the degree of design freedom was very low as it is manufactured by press-molding.

DISCLOSURE

Technical Problem

It is an object of the present disclosure to provide a seatback frame achieving good rigidity, good impact strength and high aesthetic quality.

It is another object of the present disclosure to provide a seatback for vehicles including the seatback frame.

It is yet another object of the present disclosure to provide a method for manufacturing the seatback frame.

Technical Solution

In accordance with one aspect of the present disclosure, a seatback frame includes: a body frame including a long fiber reinforced thermoplastic (LFT) composite material; and an inner frame including a continuous fiber reinforced thermoplastic (CFT) composite material buried in the body frame by insert injection molding.

The inner frame may be formed in advance by press-molding to implement a predetermined shape.

The long fiber-reinforced thermoplastic resin composite material may include a thermoplastic resin and a reinforcing long fiber, and the continuous fiber-reinforced thermoplastic resin composite material may include a thermoplastic resin and a continuous fiber for reinforcement.

The continuous fiber-reinforced thermoplastic resin composite material may include approximately 60% to 70% by weight of the reinforcing continuous fibers.

The length of the reinforcing continuous fiber may be 10 cm or more.

The long fiber-reinforced thermoplastic resin composite material may include approximately 30% to 40% by weight of the reinforcing long fibers. The length of the reinforcing long fibers may be approximately 50 mm to 100 mm.

The tensile strength of the continuous fiber-reinforced thermoplastic resin composite material may be approximately 300 MPa to 600 MPa, and the bending strength according to ASTM D790 standard specification may be approximately 350 MPa to 500 MPa.

The tensile strength of the long fiber-reinforced thermoplastic resin composite material according to ASTM D638 standard specification may be approximately 100 MPa to 120 MPa, and the bending strength according to ASTM D790 standard specification may be approximately 100 MPa to 200 MPa.

The thermoplastic resin included in the long fiber-reinforced thermoplastic resin composite material or the continuous fiber-reinforced thermoplastic resin composite material may include at least one selected from the group consisting of a polypropylene resin, a polyethylene resin, a polyamide resin, a polyester resin, a polyphenylene sulfide resin and a combination thereof.

The reinforcing long fiber, the reinforcing continuous fiber or both of them may include at least one selected from the group consisting of glass fiber, aramid fiber, natural fiber, polyester fiber, polyamide fiber and a combination thereof.

The seatback frame may further include an armrest frame, and the body frame and the armrest frame can be integrally molded.

In accordance with another aspect of the present disclosure, a seatback for vehicles includes the seatback frame.

In accordance with yet another aspect of the present disclosure, a method for manufacturing a seatback frame includes: preparing an inner frame having a predetermined shape by forming a continuous fiber reinforced thermoplastic (CFT) resin composite material in advance by press-molding; and inserting and injection-molding the inner frame into a long fiber reinforced thermoplastic (LFT) resin composite material to manufacture a body frame having the inner frame buried therein.

The press-molding may be carried out at a temperature of approximately 40° C. to 60° C.

The press molding may be carried out at a pressure of approximately 100,000 kgf/cm² to 300,000 kgf/cm².

Advantageous Effects

According to an exemplary embodiment of the present disclosure, a seatback frame can achieve good rigidity, good impact strength and high aesthetic quality.

BEST MODE

Figure 1:
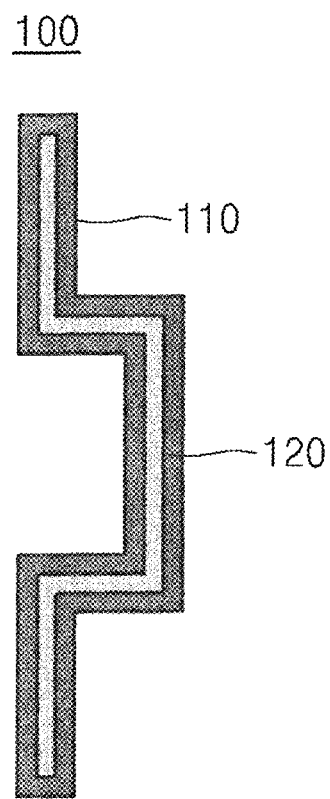
FIG. 1 is a cross-sectional view of a seatback frame according to an exemplary embodiment of the present disclosure.

In the following detailed description, reference is made to the accompanying drawings that show, by way of illustration, specific embodiments in which the claimed subject matter may be practiced. These embodiments are described in sufficient detail to enable those skilled in the art to practice the subject matter. The present disclosure may, however, be embodied in many different forms and should not be construed as limited to the embodiments set forth herein.

The drawings and description are to be regarded as illustrative in nature and not restrictive. Like reference numerals designate like elements throughout the specification.

In the drawings, the thickness of layers, regions, etc., are enlarged for the sake of clarity. In addition, in the drawings, the thickness of some layers, regions, etc., are shown as being exaggerated for convenience of illustration.

It will be understood that when an element such as a layer, region, substrate, or panel is referred to as being "on" or "under" another element, it can be directly on or under the other element or intervening elements may also be present.

In an implementation, a seatback frame includes: a body frame including a long fiber reinforced thermoplastic (LFT) resin composite material; and an inner frame including a continuous fiber reinforced thermoplastic (CFT) resin composite material buried in the body frame by insert injection-molding.

Typically, a seatback frame is made of a single material by press-molding using a steel material or by press-molding using a glass fiber mat thermoplastic resin material or a long fiber reinforced thermoplastic resin material among thermoplastic resin materials.

When an external impact is exerted due to collision of vehicles or the like, however, the seatback made of a single material may be deformed or broken significantly, which seriously endangers the safety of passengers. Further, when the seatback is formed by press-molding using a steel material, the thickness of the seatback frame has to be made substantially constant, and thus it can not become thicker or thinner. Accordingly, it is difficult to form various appearances and the degree design freedom becomes lowered.

In view of the above, according to an exemplary embodiment of the present disclosure, a seat back frame includes an inner frame including a continuous fiber reinforced thermoplastic (CFT) resin composite material inside a body frame including a long fiber reinforced thermoplastic (LFT) resin composite material, such that there are advantages in that the body frame can be molded by injection-molding to enable various appearances so that excellent design quality can be implemented while further improving rigidity and impact strength.

FIG. 1 is a cross-sectional view of a seatback frame 100 according to an exemplary embodiment of the present disclosure. The seatback frame 100 includes: a body frame 110 including a long fiber reinforced thermoplastic (LFT) resin composite material; and an inner frame 120 including a continuous fiber reinforced thermoplastic (CFT) resin composite material buried in the body frame 110 by insert injection-molding.

The inner frame 120 may be formed in advance by press-molding to realize a predetermined shape. That is, the inner frame 120 may be formed in advance by press-molding a continuous fiber-reinforced thermoplastic resin composite material to form a predetermined shape.

Typically, press-molding using a steel material is carried out under a high pressure condition and thus the structural rigidity of the molded product can be improved. However, it is difficult to form various appearances and thus the degree of design freedom is low.

In addition, the continuous fiber-reinforced thermoplastic resin effectively absorbs external impacts as compared with the long fiber-reinforced thermoplastic resin and thus has higher rigidity and impact strength. However, since it has lower fluidity, it is difficult to uniformly form the surface when press-molding is carried out.

In an implementation of the present disclosure, the inner frame 120 is formed as the continuous fiber-reinforced thermoplastic resin composite material is formed in advance by press-molding to provide a high level of rigidity and impact strength, and the inner frame 120 is inserted inside the long fiber-reinforced thermoplastic resin composite material to form the body frame by injection-molding, such that various appearances with uniform surface can be easily achieved. In addition, the seatback frame 100 with the inner frame 120 buried in the body frame 110 can be integrally formed by injection-molding, such that process of separately manufacturing and attaching the frames may be omitted. As a result, the time and cost can be further saved.

The long fiber-reinforced thermoplastic resin composite material may include a thermoplastic resin and a reinforcing long fiber, and the continuous fiber-reinforced thermoplastic resin composite material may include a thermoplastic resin and a continuous fiber for reinforcement.

The thermoplastic resin included in the long fiber-reinforced thermoplastic resin composite material or the continuous fiber-reinforced thermoplastic resin composite material may include, but is not limited to, at least one selected from a group consisting of a polypropylene resin, a polyethylene resin, a polyamide resin, a polyester resin, a polyphenylene sulfide resin and a combination thereof.

The length of the reinforcing continuous fibers may be, for example, greater than approximately 10 cm, and more specifically greater than approximately 10 cm to about 1,000 cm. However, the length may vary as desired, and is not particularly limited herein. Within the above range, the inner frame 120 may achieve high rigidity and impact strength.

The length of the reinforcing long fibers may be approximately 50 mm to 100 mm. Within the above range, sufficient rigidity and impact strength can be given to the body frame 110, and the flowability of the long fiber-reinforced thermoplastic resin can be appropriately adjusted to facilitate injection-molding, thereby achieving good surface appearance.

The reinforcing long fiber, the reinforcing continuous fiber or both of them may include, but is not limited to, at least one selected from a group consisting of glass fiber, aramid fiber, natural fiber, polyester fiber, polyamide fiber and a combination thereof.

The continuous fiber-reinforced thermoplastic resin composite material may include approximately 60% by weight to 70% by weight of the reinforcing continuous fibers. Within the above range, it is possible to realize a high level of rigidity and impact strength at a reasonable cost to sufficiently protect the passengers from external impact, while appropriate controlling the fluidity of the continuous fiber-reinforced thermoplastic resin composite material to further facilitate press-molding. Also, by reducing the weight of the inner frame 120 appropriately, it is possible to prevent the driving performance and the fuel efficiency of vehicles from being lowered.

The continuous fiber-reinforced thermoplastic resin composite material may include approximately 20% by weight to 30% by weight of the thermoplastic resin. Within the above range, the flowability of the continuous fiber-reinforced thermoplastic resin composite material can be appropriately adjusted to further facilitate press-molding, such that a predetermined shape can be achieved by the press-molding.

The tensile strength of the continuous fiber-reinforced thermoplastic resin composite material according to ASTM D638 standard specification may be approximately 300 MPa to 600 MPa, and the bending strength according to ASTM D790 standard specification may be approximately 350 MPa to 500 MPa. With the tensile strength and the bending strength within the above range, the rigidity and impact strength of the seatback frame 100 can be achieved at a high level by effectively absorbing the energy from external impact, thereby further preventing deformation and breakage The long fiber-reinforced thermoplastic resin composite material may include approximately 30% by weight to 40% by weight of the reinforcing long fibers. Within the above range, sufficient rigidity and impact strength can be given to the body frame 110, and the flowability of the long fiber-reinforced thermoplastic resin composite material can be appropriately adjusted to further facilitate injection-molding.

The long fiber-reinforced thermoplastic resin composite material may include approximately 50% by weight to 60% by weight of the thermoplastic resin. Within the above range, the flowability of the long fiber-reinforced thermoplastic resin composite material can be appropriately adjusted to further facilitate injection-molding, such that a predetermined shape of the seatback frame 100 can be obtained. The shape of the seatback frame 100 may vary depending on as desired, and is not particularly limited herein.

The tensile strength of the long fiber-reinforced thermoplastic resin composite material according to ASTM D638 standard specification may be approximately 100 MPa to 120 MPa, and the bending strength according to ASTM D790 standard specification may be approximately 100 MPa to 200 MPa. With the tensile strength and the bending strength within the above range, sufficient rigidity and impact strength can be achieved without increasing the cost too much. Accordingly, it is economically efficient.

The continuous fiber-reinforced thermoplastic resin composite material, the long fiber-reinforced thermoplastic resin composite material, or both of them may further include additives. Any additive known in the art may be used appropriately as desired.

In an implementation, the seatback frame may further include an armrest frame, and the body frame 110 and the armrest frame can be integrally molded.

Typically, when press molding is used, the body frame and the armrest frame are formed by separate manufacturing processes and then combined by welding or coupling. As a result, it takes a long time and much cost.

In view of the above, according to an exemplary embodiment of the present disclosure, the body frame 110 and the armrest frame of the seatback frame 100 can be formed integrally by injection-molding, thereby eliminating the step of welding or joining them. Accordingly, it is possible to save time and cost, and thus it is economically efficient. In addition, the degree of design freedom can be further improved, thereby achieving excellent design quality.

The armrest frame may be formed in various shapes known in the art as desired. For example, the armrest frame may include, but is not limited to, at least one selected from a group consisting of an armrest, a cup holder, a hinge, and a combination thereof.

In an implementation, the seatback frame 100 may further include a lib therein. For example, more than one libs may be included, thereby further improving the durability of the seatback frame 100, and evenly distributing the impact force when an external impact is exerted. As a result, excellent stability can be achieved. The number and shape of the libs may vary depending on as desired, and are not particularly limited herein.

The libs may be formed of a thermoplastic plastic, a fiber reinforced plastic, or a material including both of them. For example, the libs may be formed of the long fiber-reinforced thermoplastic resin composite material, thereby improving the durability and distributing the external impact force more effectively. In addition, it can be integrally formed with the body frame 110 by injection-molding, thereby simplifying the manufacturing process. As a result, time and cost can be saved.

In another implementation, there is provided a seatback for vehicles, which includes the seatback frame 100.

The seatback for vehicles may further include a seat pad, a cover, etc., sequentially from the seatback frame 100 according to any method known in the art. The types of the seat pad and the cover are not particularly limited and any known seat pads and covers may be used.

Figure 2:
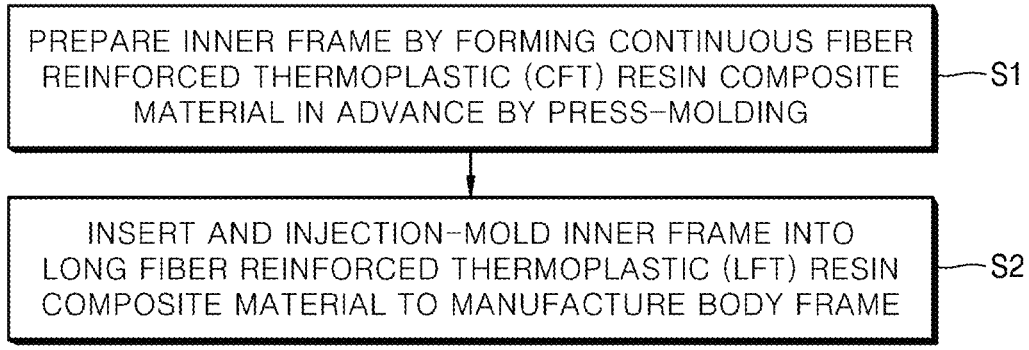
FIG. 2 is a process flow chart for illustrating a method of manufacturing a seatback frame according to yet another exemplary embodiment of the present disclosure.

FIG. 2 is a process flow chart for illustrating a method of manufacturing a seatback frame according to yet another exemplary embodiment of the present disclosure.

The method comprises: preparing an inner frame having a predetermined shape by forming a continuous fiber reinforced thermoplastic (CFT) resin composite material in advance by press-molding (step 1); and inserting and injection-molding the inner frame into a long fiber reinforced thermoplastic (LFT) resin composite material to manufacture a body frame in which the inner frame is buried (step S2).

A seat back frame thus manufactured includes the continuous fiber reinforced thermoplastic (CFT) resin composite material inside the body frame including the long fiber reinforced thermoplastic (LFT) resin composite material, such that there are advantages in that the body frame can be molded by injection-molding to enable various appearances so that excellent design quality can be implemented while achieving rigidity and impact strength to further improve stability.

Figure 3:
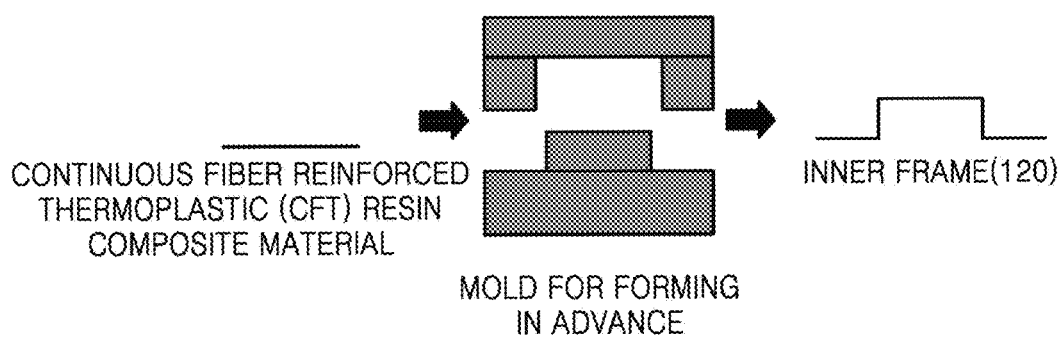
FIG. 3 is a view schematically showing a process of preparing an inner frame (step S1) of the above manufacturing method.

In the above manufacturing method, the continuous fiber reinforced thermoplastic (CFT) resin composite material may be formed in advance by press-molding to prepare the inner frame having a predetermined shape. FIG. 3 schematically shows a process of preparing an inner frame (step S1) of the above-described manufacturing method.

The continuous fiber-reinforced thermoplastic resin composite material have been described above with respect to the exemplary embodiment of the present disclosure.

As described above, by forming the continuous fiber-reinforced thermoplastic resin composite material in advance by press-molding under a high pressure condition, the inner frame can be more firmly formed in a predetermined shape, thereby further improving the structural rigidity of the inner frame. Accordingly, the seatback frame having the inner frame buried therein can achieve high rigidity and impact strength.

The press-molding may be carried out at a temperature of approximately 40° C. to 60° C., for example. Within the above range, the processibility of the continuous fiber-reinforced thermoplastic resin composite material can be appropriately adjusted to easily form a predetermined shape, while preventing the phenomenon that the materials stick to the press die, thereby reducing the material loss rate.

The press-molding may be carried out at a pressure of approximately 100,000 kgf/cm$^2$ to 300,000 kgf/cm$^2$. With the pressure within the above range, a predetermined shape of the inner frame can be sufficiently firmly implemented to thereby further improve the structural rigidity, such that the seatback frame can have good rigidity and impact strength.

Figure 4:
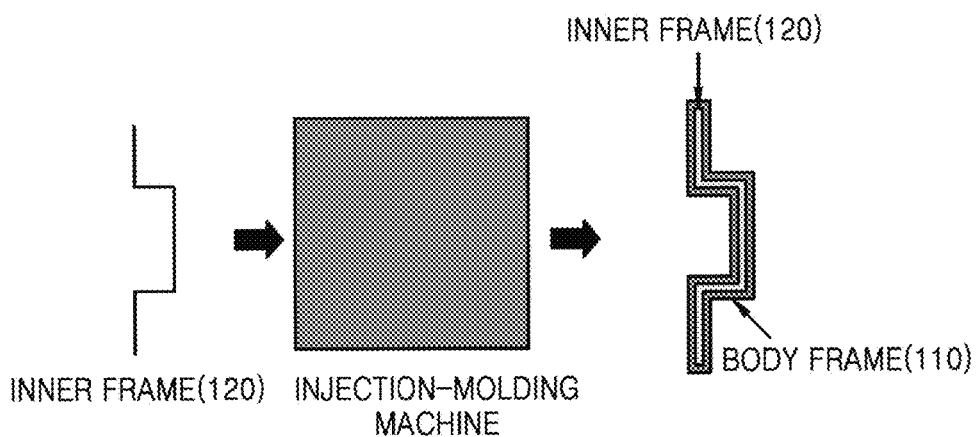
FIG. 4 is a view schematically showing a process of preparing a body frame (step S2) of the manufacturing method.

In the above manufacturing method, the inner frame is inserted into the long fiber reinforced thermoplastic (LFT) resin composite material and is subjected to injection-molding, to manufacture the body frame having the inner frame buried therein. FIG. 4 schematically shows a process of preparing a body frame (step S2) of the manufacturing method.

The long fiber-reinforced thermoplastic resin composite material has been described above with respect to the exemplary embodiment of the present disclosure.

As described above, the inner frame formed in advance by press-molding is inserted and injection-molded into the long fiber-reinforced thermoplastic resin composite material to give good rigidity and impact strength to the seat back frame, while the outer appearance of the seatback frame is formed with the long fiber-reinforced thermoplastic resin composite material having a relatively good fluidity by injection-molding, such that it is possible to easily implement various appearances with uniform surface. In addition, the seatback frame with the inner frame buried in the body frame can be integrally formed by injection-molding, such that process of separately manufacturing and attaching the frames may be omitted. As a result, the time and cost can be further saved.

When the inner frame is inserted into the long fiber-reinforced thermoplastic resin composite material to perform injection molding, the insert injection molding method to be used may be carried out according to any method known in the art. For example, after fixing the inner frame inside an injection mold, a long fiber-reinforced thermoplastic resin composite material is injected into the injection mold, such that the injection-molding can be carried out. But this is not limiting.

The injection-molding may be carried out at a temperature of approximately 30° C. to 60° C., for example. Within the above range, the processability of the long fiber-reinforced thermoplastic resin composite material can be appropriately adjusted such that the appearance of the seatback frame is easily implemented and it is possible to prevent materials from sticking to the injection mold. Accordingly, the shape of the inner frame is not deformed while reducing the material loss rate, and the structural rigidity can be maintained at a high level even after the insert injection molding The injection-molding may be carried out at a pressure of approximately 10,000 kgf/cm$^2$ to 300,000 kgf/cm$^2$, for example. With the pressure within the above range, the shape of the body frame can be sufficiently firmly implemented without deforming the shape of the inner frame, such that high structural rigidity can be maintained after the insertion injection molding, and good rigidity and impact strength can be given to the seatback frame.

In the step of manufacturing the body frame, the body frame and the armrest frame may be integrally formed by injection-molding.

Since the body frame and the armrest frame are integrally formed as described above, it is possible to eliminate the steps of preparing them separately and then welding or joining them, thereby saving time and cost. Therefore, it is possible to achieve excellent economical efficiency, and further improve the degree of design freedom to achieve aesthetic quality.

The armrest frame may be formed in various shapes known in the art as desired. For example, the armrest frame may include, but is not limited to, at least one selected from a group consisting of an armrest, a cup holder, a hinge, and a combination thereof.

According to the above manufacturing method, in the step of manufacturing the body frame, the body frame and the lib may be integrally formed by injection-molding. As such, by further including the lib, the rigidity and impact strength of the seatback frame can be further improved. In addition, since the body frame and the lib are integrally formed, the manufacturing process can be simplified and the time and cost can be further saved.

For example, more than one libs may be included, thereby further improving the durability of the seatback frame, and evenly distributing the impact force when an external impact is exerted. As a result, excellent stability can be achieved. The number and shape of the libs may vary depending on as desired, and are not particularly limited herein.

The libs may be formed of a thermoplastic plastic, a fiber reinforced plastic, or a material including both of them. For example, the libs may be formed of the long fiber-reinforced thermoplastic resin composite material, thereby improving the durability and distributing the external impact force more effectively. In addition, it can be integrally formed with the body frame by injection-molding, thereby simplifying the manufacturing process. As a result, time and cost can be saved.

Hereinafter, exemplary embodiments of the present disclosure will be described. It is to be understood, however, that the exemplary embodiments of the present disclosure described below are only for illustrative purposes and not intended to limit the present disclosure.

EXAMPLES

Example 1

A continuous fiber-reinforced thermoplastic resin composite material containing 30% by weight of polypropylene resin and 60% by weight of continuous glass fiber (GF) was press-molded under the conditions of 45° C. and 200,000 kgf/cm², to prepare an inner frame. Subsequently, the inner frame was fixed in an injection mold, and the continuous fiber-reinforced thermoplastic resin composite material containing 60% by weight of polypropylene resin and 30% by weight of long glass fiber (GF) was injected into the injection mold. Then, the material was subject to insert injection-molding under the conditions of 45° C. and 100,000 kgf/cm², to produce a body frame having the inner frame buried therein, thereby manufacturing a seatback frame.

The tensile strength of the long fiber-reinforced thermoplastic resin composite material according to ASTM D638 standard specification was 100 MPa, and the bending strength according to the ASTM D790 standard specification was 120 MPa. The tensile strength of the continuous fiber-reinforced thermoplastic resin composite material according to ASTM D638 standard specification was 550 MPa, and the bending strength according to the ASTM D790 standard specification was 450 MPa.

Comparative Example 1

A long fiber-reinforced thermoplastic resin composite material containing 30% by weight of polypropylene resin and 60% by weight of long glass fiber (GF) was injection-molded under the conditions of 45° C. and 100,000 kgf/cm², to prepare a seatback frame made of a single material.

The tensile strength of the long fiber-reinforced thermoplastic resin composite material according to ASTM D638 standard specification was 120 MPa, and the bending strength according to the ASTM D790 standard specification was 150 MPa.

EXPERIMENTAL EXAMPLES

The aesthetic quality and resistance against external impact of the seatback frame manufactured in Example 1 and Comparative Example 1 were evaluated, and the results are shown in Table 1 below.

Experimental Example 1: Falling Ball Impact Test

Measurement method: To compare the absorbed energy of the seatback frames manufactured in Example 1 and Comparative Example 1 with respect to the external impact, a specimen having the size of 80 mm×80 mm×3.2 mm was prepared for each seatback frame of Comparative Example 1. The impact strength was evaluated on them by using an impact drop tower (Instron 9250HV) according to ASTM D3763 standard specification.

In the test, the impact strength was measured by dropping a ball having the weight of 4.0 kg and the hemispherical diameter of 12.5 mm at different heights, to measure a height at which cracks were created to convert the height into energy per unit area.

Figures 5, 6:
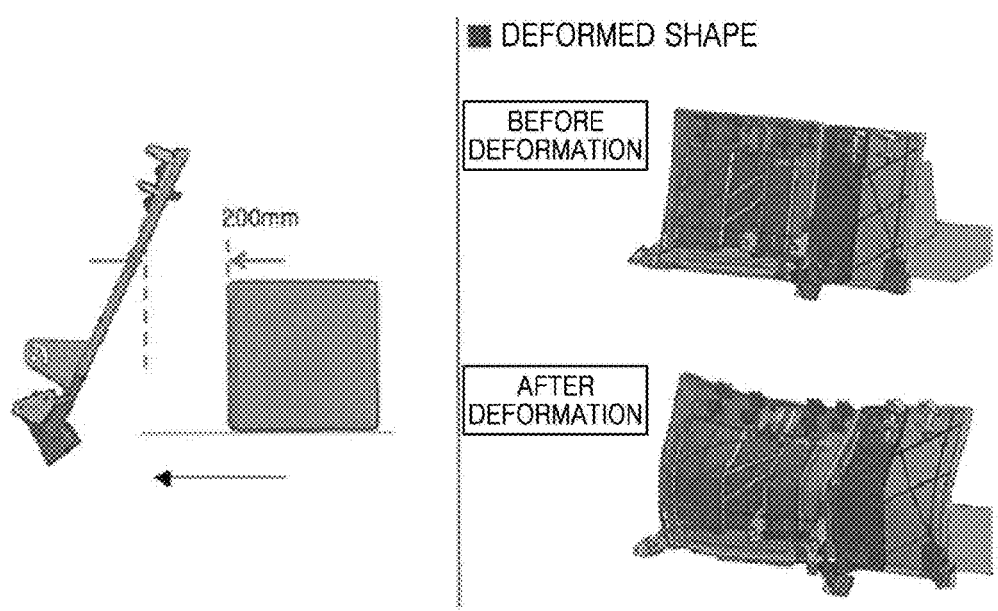
FIG. 5 shows photographs showing the results of the falling ball impact test of Example 1 and Comparative Example 1.
FIG. 6 shows images showing the results of the collision test in Example 1.

FIG. 5 shows photographs showing the results of the falling ball impact test of Example 1 and Comparative Example 1. In Example 1, the impact surface colliding with the falling ball is the continuous fiber reinforced thermoplastic resin composite material (CFT), while the opposed surface in contact with the impact surface is the long fiber reinforced thermoplastic resin composite material (LFT). On the other hand, in Comparative Example 1, both the impact surface and the opposed surface were long fiber-reinforced thermoplastic resin composite materials (LFT).

Experimental Example 2: Collision Test

Measurement method: The collision test was carried out on the seatback frames manufactured in Example 1 and Comparative Example 1 using a test block having the size of 300 mm×300 mm×300 mm.

Specifically, the distance (d) between the seatback frame and the test block, that is, the straight line from the surface of the test block facing the frame to the seatback frame in parallel with the bottom surface of the test block, is 200 mm, and the test block collided with the frame at the speed of 55 km/h.

FIG. 6 is images showing the results of the collision test in Example 1.

Figure 7:
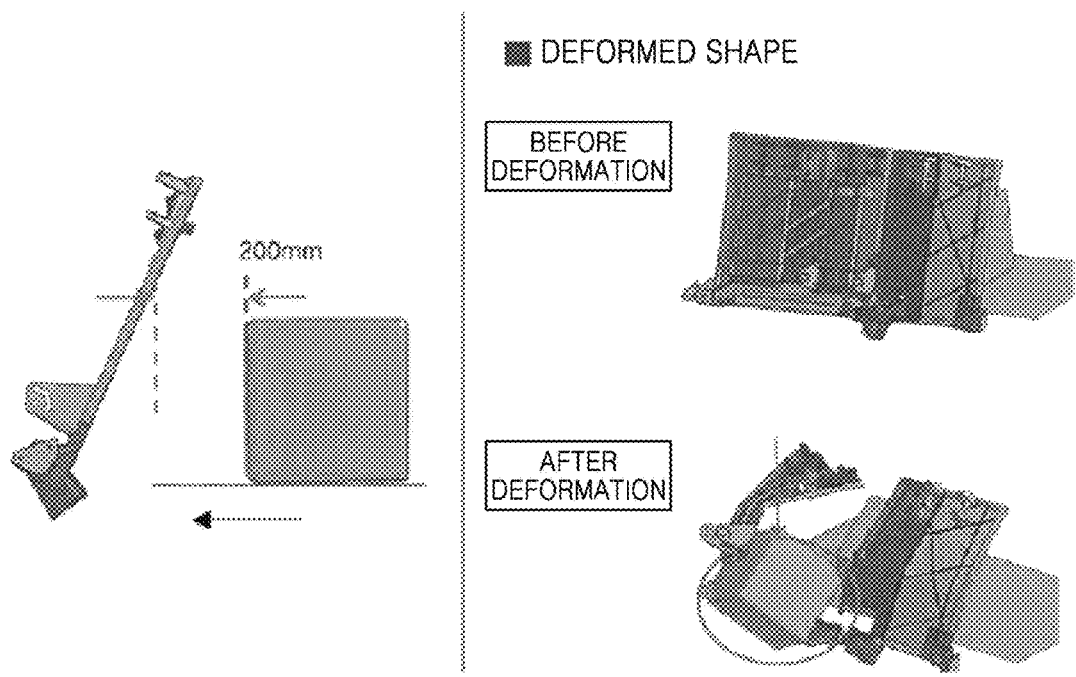
FIG. 7 shows images showing the results of the collision test in Comparative Example 1.

FIG. 7 is images showing the results of the collision test in Comparative Example 1.

TABLE 1

|  | Falling Ball Impact Strength (J/m²) | Collision Test |
| --- | --- | --- |
| Example 1 | 9.58 | Good |
| Comparative Example 1 | 8.45 | Bad |

It can be seen that the seatback frame according to Example 1 absorbs more energy per unit area so that the impact strength is excellent and cracks are smaller, as shown in FIG. 5. Further, as shown in FIG. 6, it can be clearly predicted that the seatback frame is bent but not broken in the collision test, such that no sharp edge is created. In addition, the test block does not protrude, thereby achieving higher safety.

In contrast, it can be seen that the seatback frame according to Comparative Example 1 absorbs less energy per unit area so that the impact strength is poor and cracks take place wider, as shown in FIG. 5. Further, as shown in FIG. 7, the seat back frame is broken such that the sharp edge is created, and accordingly the test block protrudes in the test. Accordingly, it can be clearly predicted that the safety is significantly lowered.

In the foregoing specification, the present disclosure has been described with reference to the specific exemplary embodiments. It will, however, be evident that various modifications and changes may be made therein without departing from the broader spirit and scope of the present disclosure invention as set forth in the appended claims.

The invention claimed is:

1. A seatback frame comprising:
   a body frame comprising a long fiber-reinforced thermoplastic (LFT) resin composite material, the long fiber-reinforced thermoplastic resin composite material comprising a thermoplastic resin and a reinforcing long fiber; and
   an inner frame comprising a continuous fiber-reinforced thermoplastic (CFT) resin composite material buried in the body frame by insert injection-molding, the continuous fiber-reinforced thermoplastic resin composite material comprising a thermoplastic resin and a reinforcing continuous fiber,
   wherein
      the inner frame is formed in advance by press-molding to implement a predetermined shape,
      the long fiber-reinforced thermoplastic resin composite material contains 30% by weight to 40% by weight of the reinforcing long fibers having a length from 50 mm to 100 mm, the continuous fiber-reinforced thermoplastic resin composite material contains 60% by weight to 70% by weight of the reinforcing continuous fibers having a length of 10 cm or more, the continuous fiber-reinforced thermoplastic resin composite material has a tensile strength of 300 MPa to 600 MPa according to ASTM D638 standard specification, and a bending strength of 350 MPa to 500 MPa according to ASTM D790 standard specification, the long fiber-reinforced thermoplastic resin composite material has a tensile strength of 100 MPa to 120 MPa according to ASTM D638 standard specification, and a bending strength of 100 MPa to 200 MPa according to ASTM D790 standard specification.

2. The seatback frame according to claim 1, wherein the thermoplastic resin included in the long fiber-reinforced thermoplastic resin composite material or the continuous fiber-reinforced thermoplastic resin composite material comprises at least one selected from a group consisting of a polypropylene resin, a polyethylene resin, a polyamide resin, a polyester resin, a polyphenylene sulfide resin and a combination thereof.

3. The seatback frame according to claim 1, wherein the reinforcing long fiber and/or the reinforcing continuous fiber comprises at least one selected from a group consisting of glass fiber, aramid fiber, natural fiber, polyester fiber, polyamide fiber and a combination thereof.

4. The seatback frame according to claim 1, further comprising:
an armrest frame,
wherein the body frame and the armrest frame are integrally molded.

5. A seatback for vehicles comprising: the seatback frame according to claim 1.

6. A method for manufacturing a seatback frame, the method comprising:
preparing an inner frame having a predetermined shape by forming a continuous fiber-reinforced thermoplastic (CFT) resin composite material in advance by press-molding, the long fiber-reinforced thermoplastic resin composite material comprising a thermoplastic resin and a reinforcing long fiber; and inserting and injection-molding the inner frame into a long fiber-reinforced thermoplastic (LFT) resin composite material to manufacture a body frame having the inner frame buried therein, the continuous fiber-reinforced thermoplastic resin composite material comprising a thermoplastic resin and a reinforcing continuous fiber, wherein the long fiber-reinforced thermoplastic resin composite material contains 30% by weight to 40% by weight of the reinforcing long fibers having a length from 50 mm to 100 mm, the long fiber-reinforced thermoplastic resin composite material has a tensile strength of 100 MPa to 120 MPa according to ASTM D638 standard specification, and a bending strength of 100 MPa to 200 MPa according to ASTM D790 standard specification, the continuous fiber-reinforced thermoplastic resin composite material contains 60% by weight to 70% by weight of the reinforcing continuous fibers having a length of 10 cm or more, and the continuous fiber-reinforced thermoplastic resin composite material has a tensile strength of 300 MPa to 600 MPa according to ASTM D638 standard specification, and a bending strength of 350 MPa to 500 MPa according to ASTM D790 standard specification.

7. The method according to claim 6, wherein the press-molding is carried out at a temperature of 40° C. to 60° C.

8. The method according to claim 7, wherein the press-molding is carried out at a pressure of 100,000 kgf/cm$^2$ to 300,000 kgf/cm$^2$.

* * * * *